J. REGESTER.

Try-Cock for Steam-Generators.

No. 8,739. Reissued June 3, 1879.

Witnesses,

W. A. Bertram

D. L. H. Barclay

Inventor

Joshua Regester.

by

R. D. Williams.

Attorney.

M. PETERS, PHOTO-LITHOGRAPHER, WASHINGTON, D. C.

UNITED STATES PATENT OFFICE.

JOSHUA REGESTER, OF BALTIMORE, MARYLAND.

IMPROVEMENT IN TRY-COCKS FOR STEAM-GENERATORS.

Specification forming part of Letters Patent No. 53,337, dated March 20, 1866; Reissue No. 8,739, dated June 3, 1879; application filed May 6, 1879.

*To all whom it may concern:*

Be it known that I, JOSHUA REGESTER, of Baltimore city, State of Maryland, have invented certain new and useful Improvements in Gage-Cocks; and I hereby declare the same to be fully, clearly, and exactly described as follows, reference being had to the accompanying drawings, in which—

Figure 1:
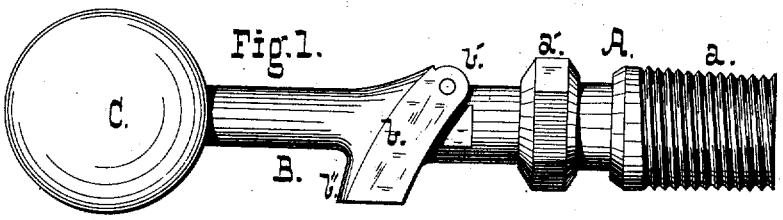
Figure 2:
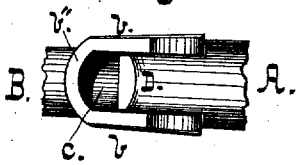
Figure 3:
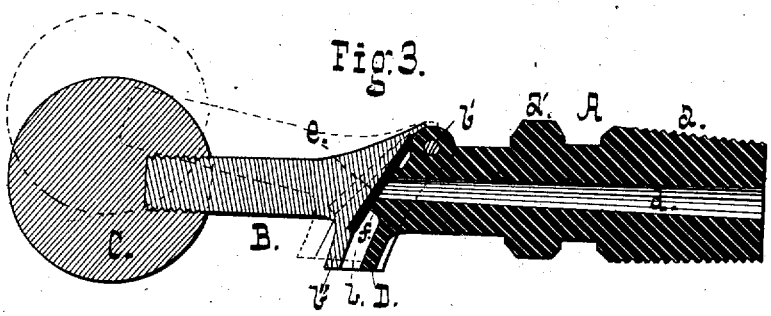

Figure 1 is a side elevation of the device; Fig. 2, a bottom plan of a part of the same; Fig. 3, a vertical longitudinal sectional view, the valve being shown in its lifted position in dotted lines.

My invention relates to what are known as gage-cocks or try-cocks for steam-boilers, being used to determine within certain limits the level of water in the boiler; and it consists, broadly, in a device of the class named having a valve and valve-seat inclined to the axis of the efflux-pipe, as hereinafter described, and specifically in the particular form of the device in respect to certain details of construction, as will be explained.

Gage-cocks have heretofore been constructed generally in one of two generic forms, each of which is open to objections which it is the design of my invention to obviate.

In one the gage-cock consisted of a spigot having a valve and seat, which necessarily were ground true and smooth, rendering the device expensive, while leakage sooner or later occurred, owing to wear of the parts. When worn the cocks were difficult to repair, and under any circumstances, if of sufficiently close and accurate fit to prevent leakage at low temperatures, they were liable to jam at higher ones.

Gage-cocks of the other class referred to consisted of tubes inserted in the boiler, and having a weighted lever adapted to close the outer end of the tube. These were not liable to get out of repair nor leak, and when they did the worn parts were readily renewed; but they were open to the serious objection that the person using them was liable to be scalded or injured, or at least inconvenienced by the escaping steam or water as the lever was raised.

The gage-cock about to be described belongs to the latter class referred to, and, while securing all the advantages incident thereto in point of simplicity, durability, facility for renewing worn-out parts, and general efficiency, it obviates all danger of injury to the user, as it imparts to the escaping jet of steam or water a positive downward direction, thereby securing the sole advantage of the spigot class of gage-cocks.

In the accompanying drawings, A is the vent-stem, having an axial opening, *d*, and threaded at *a*, so that it may be screwed into the head or side of the boiler. A polygonal shoulder, *a'*, is formed on the stem for the spanner.

B is the lever, carrying a weight, C, and pivoted to the vent-stem at *b'*, as shown. The forward end of the lever is formed into a hood or half-nozzle, *b''*, having side pieces, *b*, through which the pivot *b'* passes, and which move past the lip D, that is formed on the end of the vent-stem A, and form with it a nozzle somewhat similar to that of an ordinary spigot.

Upon the end of the vent-stem A is formed a slightly-projecting valve-seat, *f*, inclined as shown to the axis of the opening *d*, and opposite it is embedded in the end of the lever B the valve *e*. This is constructed of india-rubber or equivalent soft and durable substance, and is, preferably, sprung into a dovetail recess in the end of the lever B, the edges of the valve being suitably beveled, whereby accidental displacement is prevented.

In operation, the weight C holds the valve closely against its seat, the latter becoming somewhat embedded in the face of the valve, and a perfectly steam and water tight joint is formed. When the lever B is lifted in using the device, as shown in dotted lines, Fig. 3, the steam or water, as the case may be, escapes, and, impinging against the face of the valve, is directed downward through the nozzle. The hood formed by the parts *b b''* effectually prevents any of the steam or water from being thrown upon the hand or person of the user, and directs it downward into the funnel, if one is used.

It will be seen that the only parts of the device upon which any notable amount of wear can fall are the pivot and valve, and either of these may readily be renewed at a trifling expense and with little trouble.

The salient feature of my invention consists, as hereinbefore indicated, in forming the valve and valve-seat at an angle to the terminal axis of the vent-stem. This construction imparts to the escaping jet a downward direction in the axis of the nozzle, the jet being, as it were, deflected by the inclined surface of the valve. In gage-cocks of this general class the vent-stem has heretofore been cut off at right angles to its length, and as the jet impinged upon the valve as the latter was withdrawn the course of the jet was abruptly changed, causing the steam or water to escape in all directions where it could find an outlet between the working parts of the device. This was a source of annoyance, which it was the design and is the function of my invention to obviate.

Having thus described my invention, what I claim as new, and desire to secure by Letters Patent, is—

1. In a gage-cock, a lever and vent-stem having a valve and seat inclined to the terminal axis of the vent-stem, substantially as and for the purpose described.

2. In a gage-cock, a lever and vent-stem having a valve and seat inclined to the terminal axis of the vent-stem, in combination with a suitable nozzle, substantially as described.

3. In combination with the vent-stem having valve-seat inclined as described, the weighted lever having the valve *e* and side pieces inclosing the lip upon the valve-stem, and forming with it a downwardly-projecting nozzle, substantially as set forth.

JOSHUA REGESTER.

Witnesses:

W. PAINTER,

R. D. WILLIAMS.